UNITED STATES PATENT OFFICE.

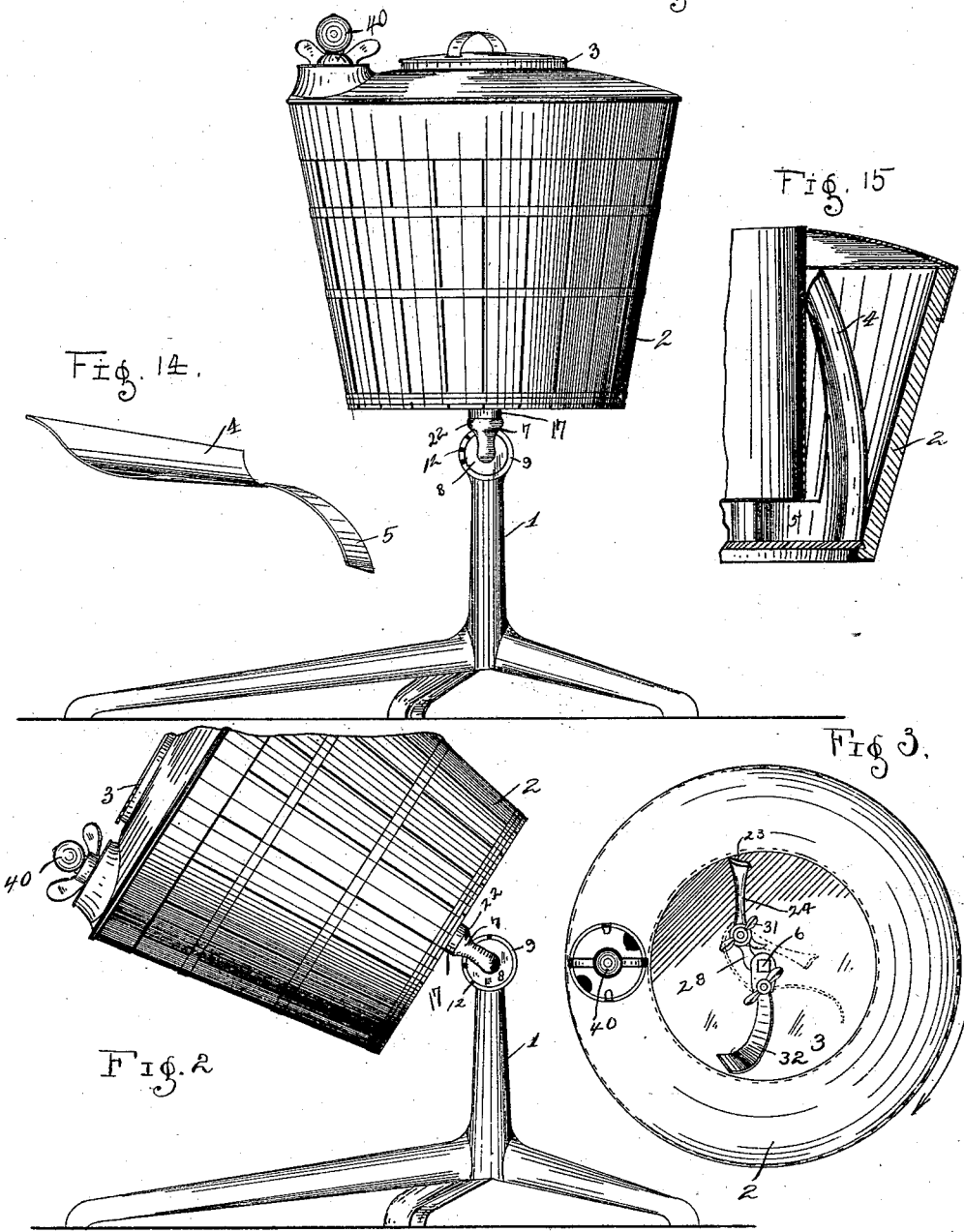

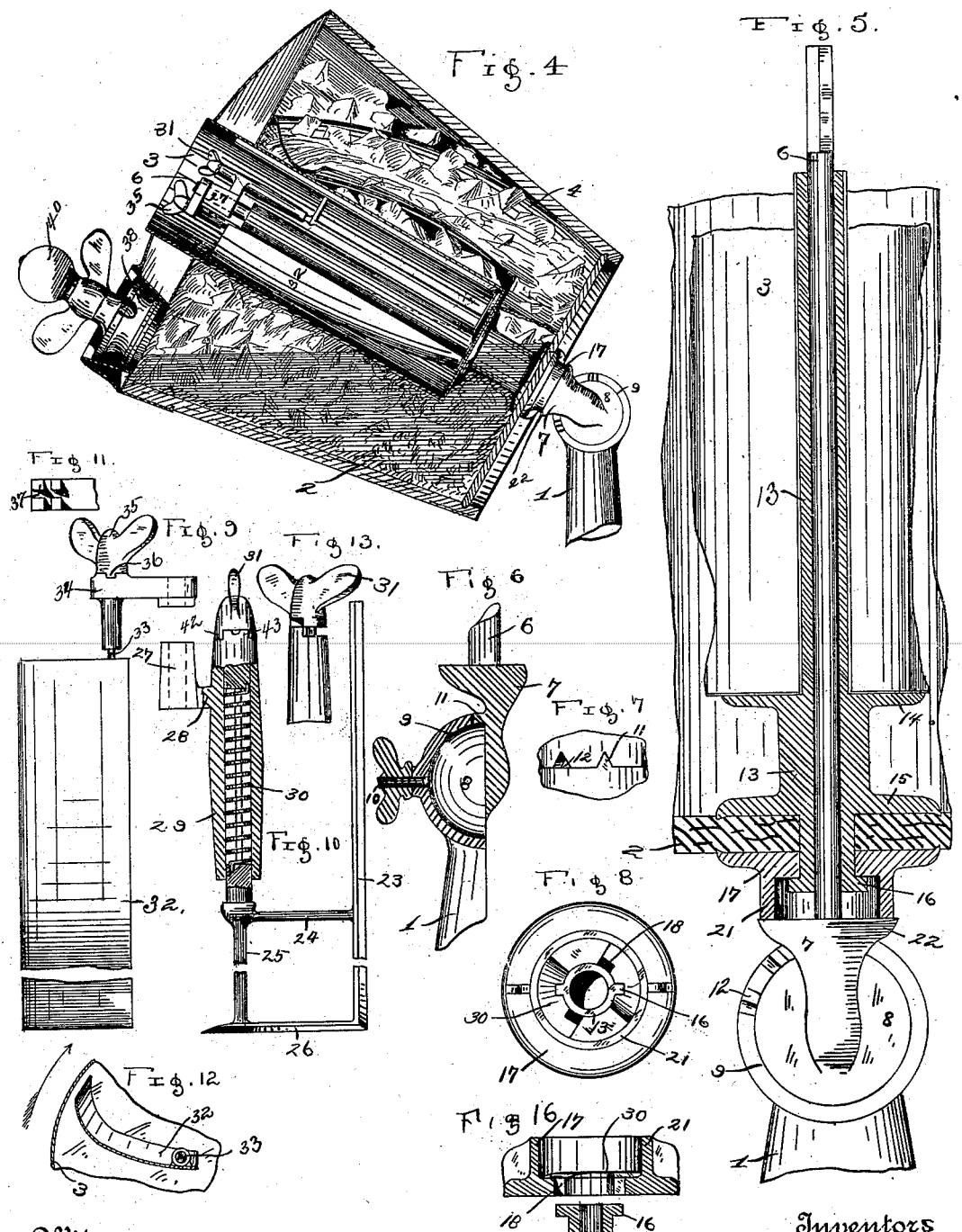

OMER M. PERKINS AND JOSIAH P. PERKINS, OF INDIANAPOLIS, INDIANA; SAID JOSIAH P. PERKINS ASSIGNOR TO SAID OMER M. PERKINS.

ICE-CREAM FREEZER.

SPECIFICATION forming part of Letters Patent No. 553,495, dated January 21, 1896.

Application filed April 22, 1895. Serial No. 546,798. (No model.)

*To all whom it may concern:*

Be it known that we, OMER M. PERKINS and JOSIAH P. PERKINS, of Indianapolis, county of Marion, and State of Indiana, have invented a certain new and useful Device for Making Ices; and we do hereby declare that the following is a full, clear, and exact description thereof, reference being had to the accompanying drawings, in which like figures refer to like parts.

Our invention relates to a machine for making ices, and has for its object the construction of a device that will freeze cream or other fluid more quickly than any of which we are aware, will make a better product out of poor material, and will be simple in construction and easy of manipulation.

The full nature of the invention will appear from the accompanying drawings and the following description.

In the drawings, Figure 1 is an elevation of our freezer in a vertical position. Fig. 2 is the same in an inclined position, the top portion being broken away. Fig. 3 is a plan view of the freezer with the lid removed. Fig. 4 is a central vertical section of the freezer inclined. Fig. 5 is central vertical section of the device, showing especially the means of supporting the receptacles for the freezing material and the material to be frozen. Fig. 6 is a vertical section of the ball-and-socket joint in the supporting-frame. Fig. 7 is a partial plan view of such joint. Fig. 8 is a bottom view of the washer that secures the receptacle for the freezing material to the tubular support and the receptacle for the material to be frozen. Fig. 9 is an elevation of the worker. Fig. 10 is a detail of the scraper and its connections. Fig. 11 is a plan view of a portion of the supporting-bracket of the worker. Fig. 12 is a cross-section of the worker. Fig. 13 is a detail of the means for holding the scraper in place. Fig. 14 is a detail of the device for distributing the freezing material. Fig. 15 is a vertical central section of a portion of the two receptacles, showing the distributer in place. Fig. 16 is a sectional view of the washer shown in Fig. 8.

Upon a suitable support 1 we mount our freezer, connecting them by the ball-and-socket joint shown, or by a compass-joint or equivalent means for readily inclining the freezer when and to the extent desired.

The freezer consists of a large receptacle 2 for the refrigerating material and a smaller receptacle 3 for the material to be frozen, that is mounted within the larger receptacle, so that the freezing material envelops the bottom as well as the sides of the receptacle 3. The inner receptacle is a cylinder of equal diameter at all points, while the outer receptacle is the frustum of a cone with its large end upward. This combination is for the prevention of all the pieces of ice, when ice and salt constitute the refrigerating material, from settling at once to the bottom of the outer receptacle, leaving nothing about the upper portion of the inner receptacle. In this form the space between the two receptacles is intended to be of such small dimensions at the lower end that the larger pieces of ice will be held in the upper portion and in contact with the upper part of the inner receptacle, whereby the material within such receptacle that is at the upper end will be quickly frozen. Carrying out this idea of subjecting the bottom and sides directly to the action of the refrigerating material, we provide, as before stated, means for inclining the freezer, as seen in Fig. 4. As there seen, the water in the outer vessel contacts with the end and lower side of the inner tank all the time during the freezing process. We also add the device 4, (seen in Fig. 14,) securing it in the outer vessel, as seen in Fig. 15, for the purpose of carrying or elevating the cold water, salt, and small ice and depositing them against the upper portion of the inner receptacle. This operates like an Archimedean screw, being set in the outer vessel at an angle to its vertical plane, so that the rotation of the freezer causes its operation. This washes the large pieces of ice at the upper end with water and salt and agitates the whole, thus materially increasing or intensifying the refrigerating power of the material on the inner vessel. Also by this arrangement we can freeze cream, &c., as long as there is any ice in the outer vessel, however small in quantity. The body of this distributer 4 is concave, as shown, and is secured by soldering the flange 5 to the inner or outer vessel, but it may be secured in any desirable manner.

The spindle 6 is secured to the shank or support 7, which has on its lower end the ball 8 that is held within the socket 9 by the bolt and nut 10. The engaging faces of the ball and socket are serrated or provided with the teeth 11 and indentations 12 for holding the freezer at the desired inclination. When the freezer is being filled or emptied, the vertical position is best, but during the freezing the inclined position is most effective.

The receptacles are secured in place by the bearing-tube 13, provided at its lower end with the upper collar, 14, soldered or otherwise secured to the inner receptacle, which is preferably made of tin, and the lower collar, 15, clamped or secured otherwise to the bottom of the outer receptacle, which is made preferably of wood. These collars are far enough apart to permit enough refrigerating material under the inner receptacle to act there as effectively as on the sides. The lower end of the tubular bearing 13 has the outwardly-extending lugs 16, (seen in Fig. 8,) over which the washer 17 slips by reason of the notches 18, and when turned about slightly the cam-faces 30 cause it to clamp the bottom of the outer receptacle to the lower collar, 15. The opposing faces of the lower collar and washer are slightly concaved near their edges, enabling them to bite into the wood and render the outer receptacle water-tight. Any ordinary means of securing the tubular bearing and the outer receptacle together will suffice, but the form shown is preferable.

The whole weight of the freezer is supported by the lower rim 21 of the washer 17, and such rim bears upon a small turn-table 22 formed on the upper end of the shank 7 of the spindle. It will be observed that in the construction herein shown the spindle 6 is stationary, while the receptacles or freezer is rotary. So far as many features of our invention are concerned the freezer can be made stationary and the spindle rotary. The upper end of the spindle is preferably square, as shown in Fig. 5.

Within the inner receptacle 3 we provide a scraper 23, that is secured by the arm 24 to the spindle 25. We provide, also, a scraper 26 to act on the bottom of the can, and it extends from the lower end of the scraper 23 to the lower end of the spindle 25. The spindle 25, and therefore the whole scraper mechanism, is spring-supported on the upper end of the main sleeve 13. This is accomplished by means of the bracket 27, provided with a central square aperture that fits over the upper end of the sleeve 13 and which is secured by means of the arm 28 and sleeve or barrel 29, through which the upper end of the spindle 25 extends and in which there is a spiral spring 30, that tends to push the scraper down against the bottom and also outward against the sides of the inner tank. This renders the scraper adjustable to the irregularities in the surface of the inner tank and also prevents stopping the freezer or breaking the mechanism, as the spring would allow the scraper to yield when it meets too much resistance.

The arm 24 and lower end 26 of the scraper are so long that the side of the inner tank will prevent the scraper 23 from turning so far that such arm 24 and the arm 28 will extend parallel. Hence the arm 24 always extends at an angle to the arm 28, and the spring 30 keeps the scraper bearing against the side of the tank. The blade of the scraper 23 is held at such an angle to the side of the tank, as seen in Fig. 3, that there will not be enough friction between them when there is a reverse movement of the tank to cause the scraper and tank to lock. The scraping edge of the scraper 23 is beveled on its back side and made sharp on its contacting side, as shown. The upper end of the spindle 25 is squared to receive and hold the finger-piece 31, which slips such spindle up and down. Its lower face has teeth 42, that engage teeth 43 on the sleeve 29, as seen in Fig. 10, and limit the outward movement of the scraper. These lugs or stops are so located as to allow a certain limit of movement, both ways, of the scraper when extended at work. When it is desired to hold the scraper slightly elevated from the bottom of the vessel and also away from the side of the tank, the finger-piece 31 is elevated and turned to the position shown in Fig. 13, where a lug and indentation hold it rigidly in place. When the scraper is down, it is in the position shown in Fig. 10. The function of the scraper is to constantly remove the film of frozen cream, &c., from the interior surface of the inner receptacle and throw it back into the body of the cream, thus leaving the cold surface exposed for the contact of unfrozen cream. The action on the bottom of the tank is the same as on the side.

When the scraper is turned back away from the side of the tank, it acts as an effective worker to mix and work up the cream; but to accomplish this more thoroughly, and especially to work the material while the scraper is scraping, we provide the worker 32, which is secured at its inner edge to the shank 33, that is carried by the bracket 34. This bracket is mounted by means of a square aperture on the square upper end of the main spindle 6 to prevent its turning. The finger-piece 35 is provided with teeth 36 and rests on and interlocks with corresponding teeth 37 on the bracket 34. By this means the worker can be set so that its outer edge will be near or distant from the side of the tank. The worker is curved in cross-section, preferably, as seen in Fig. 12, and the tank rotates about it in the direction of the arrow in said figure. In this manner the worker pushes the unfrozen material to the cold inner surface of the tank, and the scraper, on the other hand, removes the frozen material from the tank, and thus the two co-operate to bring the unfrozen material in contact with the freezing-tank and remove it as fast as frozen. This is in addition to the mere working or mixing of the material. When the freezer is operated in an inclined position, to prevent the worker from working the cream up against or out of the top of the inner vessel, we find it desirable to mount the worker at a slight angle to the axis of such tank, so that it will tend to work the material toward the bottom instead of the top. The bottom, too, is the colder place, and hence this tends to hasten the freezing process. This result would be accomplished, too, by crimping the worker toward the bottom.

Of course the inner receptacle may have a lid, and the outer one preferably has a double water-tight top, as shown. A suitable opening 38 is provided for inserting the freezing material, and a knob 40 for rotating the freezer. The knob can be elsewhere located or other ordinary means be provided for turning the device.

What we claim as our invention, and desire to secure by Letters Patent, is—

1. In a device for making ices, the outer tank for the freezing material, the inner receptacle for the material to be frozen, a tubular bearing extending up through the bottom of both receptacles and rigidly secured to both, a base, a spindle mounted on the base by a joint that permits it to be set at any angle and which extends up through said tubular bearing, and means mounted on the upper end of the spindle for working the material within the inner receptacle, substantially as set forth.

2. In a device for making ices, an inner and an outer receptacle, a tubular bearing extending up through the bottom of such receptacles provided with rigidly secured collars separated from each other, one secured to the bottom of the inner receptacle and the other to the bottom of the outer one, a spindle extending up through such tubular bearing, and means mounted on the upper end of such spindle for stirring the material in the inner receptacle.

3. In a device for making ices, an inner and an outer receptacle, a tubular bearing extending up through the bottom of both and provided with outwardly extending lugs at its lower end and with collars separated from each other, one of which is secured to the bottom of the inner receptacle and the other to the bottom of the outer one, and a washer having cam faces and notches, as shown, for clamping the bottom of the outer receptacle to the lower collar, substantially as set forth.

4. In a device for making ices, an outer tank for the freezing material, a cylindrical inner receptacle for the material to be frozen, and a distributer mounted between the two and inclined from the bottom to the top whereby when the freezer is rotated in an upright or inclined position it will remove a portion of the freezing material from the bottom of the outer tank and deposit it on the upper portion of the inner receptacle, substantially as set forth.

5. In a device for making ices, a cylindrical inner receptacle, a conical outer receptacle, means for securing the two rigidly together so that their bottoms will be some distance apart, and a distributer secured between the two curved in cross section and inclined from the bottom to the top and having an extension from its lower end between the bottoms of the two receptacles to their axis, substantially as set forth.

6. In a device for making ices, a cylindrical receptacle for the material to be frozen, a scraper mounted on the spindle within such receptacle to one side of its center, and a spiral spring so mounted about such spindle that it will tend to push the spindle downward and also rotate it so that the scraper will be kept in close engagement with the side of the receptacle, substantially as set forth.

7. In a device for making ices, a cylindrical receptacle for the material to be frozen, a tubular bearing extending up from its bottom almost to its top, a main spindle extending up through such tubular bearing, a bracket mounted on the upper end of such spindle, a sleeve secured to such bracket so as to be some distance away from the main spindle, a spindle mounted in the sleeve, a scraper carried on arms extending from such spindle, a spiral spring carried in the sleeve so connected up with the spindle as to tend to rotate it, and a device on the upper end of the spindle that engages the upper end of the sleeve to hold the scraper away from contact with the side if desired.

8. In a device for making ices, a receptacle for the material to be frozen, a worker mounted therein, and a clutch for holding it in any desired position, substantially as set forth.

9. In a device for making ices, a receptacle for the material to be frozen, a worker therein extending parallel with the receptacle and having a shank along its inner vertical edge, such shank being mounted to one side of the center of the receptacle, and a mechanism for adjusting the position of the worker, substantially as shown.

10. In a device for making ices, a receptacle for the material to be frozen, a tubular bearing extending up from the bottom thereof nearly to the top, a spindle extending up through such tubular bearing, brackets carried on the upper end of the spindle, a spring controlled scraper mounted in a bracket to one side of the center of the receptacle, a deflecting worker mounted also in a bracket to one side of the center, and mechanism for setting the scraper and worker in any desired position.

In witness whereof we have hereunto set our hands this 16th day of April, 1895.

OMER M. PERKINS.
JOSIAH P. PERKINS.

Witnesses:
V. H. LOCKWOOD,
VIENNA PURDY.